United States Patent
Chochois Kartmann et al.

(10) Patent No.: US 8,605,740 B2
(45) Date of Patent: Dec. 10, 2013

(54) HIGH AVAILABILITY NETWORK SYSTEM

(75) Inventors: Bénédicte Chochois Kartmann, Montrouge/Cedex (FR); Eric Chenu, Chaville (FR); Benoit Fumery, Bures sur Yvette (FR); Nicolas Renard, Paris (FR); Raphaëlle De Lajudie, Paris (FR)

(73) Assignee: Siemens SAS, St. Denis (FR)

( * ) Notice: Subject to any disclaimer, the term of this patent is extended or adjusted under 35 U.S.C. 154(b) by 1078 days.

(21) Appl. No.: 12/376,022

(22) PCT Filed: Aug. 2, 2006

(86) PCT No.: PCT/FR2006/001897
§ 371 (c)(1),
(2), (4) Date: Oct. 28, 2009

(87) PCT Pub. No.: WO2008/015316
PCT Pub. Date: Feb. 7, 2008

(65) Prior Publication Data
US 2010/0049830 A1 Feb. 25, 2010

(51) Int. Cl.
*H04L 12/28* (2006.01)
(52) U.S. Cl.
USPC .................................................. 370/419
(58) Field of Classification Search
None
See application file for complete search history.

(56) References Cited

U.S. PATENT DOCUMENTS

| | | | |
|---|---|---|---|
| 7,474,015 B2 | 1/2009 | Enders et al. | |
| 2002/0180592 A1* | 12/2002 | Gromov | 340/310.01 |
| 2005/0040709 A1* | 2/2005 | Enders et al. | 307/10.1 |
| 2006/0165054 A1* | 7/2006 | Iwamura | 370/351 |

FOREIGN PATENT DOCUMENTS

| | | |
|---|---|---|
| CN | 1434577 A | 8/2003 |
| CN | 2638337 Y | 9/2004 |
| CN | 1550087 A | 11/2004 |
| EP | 1533913 A1 | 5/2005 |
| JP | 2005504483 A | 2/2005 |
| WO | 9731430 A1 | 8/1997 |
| WO | 03094461 A1 | 11/2003 |

\* cited by examiner

*Primary Examiner* — Yong Zhou
(74) *Attorney, Agent, or Firm* — Laurence A. Greenberg; Werner H. Stemer; Ralph E. Locher (57) ABSTRACT

A communication system adapted for a vehicle includes a network for communication between at least two communication interfaces respectively connected to a first controller which manages/runs a control application and a second controller which also manages/runs the control application. The communication interfaces have, per controller, at least one communication port from which a communication link is possible. The communication link is a PLC (Power Line Communication) link having at least two electrically conductive links connected to each of the respective communication ports through at least one coupling transformer, for a control application transmission between the two communication interfaces.

30 Claims, 4 Drawing Sheets

HIGH AVAILABILITY NETWORK SYSTEM

BACKGROUND OF THE INVENTION

Field of the Invention

The present invention relates to a communication system including a communication network between at least two communication interfaces respectively connected to a first controller managing a command application and a second controller managing a command application, and for which the communication interfaces have, for each controller, at least one communication port, from which a communication link is possible.

The invention is adapted in particular to a vehicle. By vehicle, it is understood that various means of transport are concerned, more particularly in the field of transporting passengers and/or goods. Thus, transport by rail such as a train and its carriages on a rail, a tramway, but also a pneumatic-tired train, with or without rails, or a bus with at least one compartment are included within the scope of the invention for instance. Other means of transport outside the land-based field could also be concerned such as a maritime shuttle service like a "ferryboat". In particular, all these vehicles comprise means of control or command, subsequently commonly called, controllers, which enable command applications to be created or run, for example for vehicle guidance, or even automatic control of the vehicle if the latter has no driver. Numerous other applications are understood to be possible, but will not be listed for the sake of clarity.

Thus, from a first point of view internal to the vehicle, a communication network between at least two communication interfaces is known, these being respectively connected to a first controller which creates a command application and a second controller which runs the command application. The controllers can for example comprise one or more available computers, in this case, on-board the vehicle. The communication interfaces have, for each controller, at least one communication port towards a common Ethernet, ADSL, WiFi, etc. communication link in order to enable a transmission of information between the controllers via the Modem, Switch, bridge-relay, etc. type communication interfaces. Redundant links, in the event of a fault on a point-to-point link can also be created, for example by increasing the transmission links or cables which will be activated for a new routing of data by means of a changeover switch, router, for example, by reconfiguring a router, itself governed by an Internet/Ethernet type protocol.

From another view point external to the vehicle, information can also be transmitted from a first communication interface on the ground, for example positioned on the path of the vehicle, towards a second communication interface on-board the vehicle and vice versa. Moreover by extension, the first communication interface can also be networked or "sub-net" with a third communication interface on the ground, for example towards a central traffic management server or an access point on another vehicle. In short, it is easy to understand that the communication systems adapted for the vehicle, in other words in the vehicle, on the ground and between the vehicle and the ground, comprise complex networks, the architecture of the network links of which is multi-point and the data transmission protocols can be varied according to the desired applications.

An effective example illustrating the complexity of a communication network between a train on rails connected to electrical catenaries and an "IP network" (IP="Internet Protocol") type network which can be external to the train (for example on the ground) is given by EP 1533913 A1. In order to enable a communication interface of the IP network to communicate with a communication interface ("end user") on-board the vehicle, a data converter ("converting means") is positioned along the rails to convert the data transmitted or received in accordance with the "IP" format to a "PLC" ("=Power Line Communications") type format. The data will be, for example transmitted to the converter output in PLC format via electrical catenaries to the communication interface of the train. To obtain the necessary power on the catenaries, the converter comprises several conversion units along the rail. The "PLC" type communication technique, also referred to as PLC ("Courants Porteurs en Ligne") in French, enables, in particular in this example, a sufficiently wide bandwidth for high throughput data on the IP network to the train and vice versa to be used (bi-directional transmission possible) and to be suited to a ground-train communication for trains of various lengths. Moreover, the converter used is associated with repeating means which receive or transmit data, the signals of which are separated into frequency bands intended to determine the direction of transmission (bilateral) of data between the IP network and the train. If a section of the journey does not comprise catenaries, a PLC type communication switch is activated towards a radio frequency type communication switch, in order to provide a radio link which is also dual-frequency in accordance with the direction of data transmission. The PLC type link and the radio frequency type link thus form a redundant link in the event of use of one or other of the links not being possible. In short, for an advantageously redundant single link between a train and a ground network, two different types of communication are used, which therefore requires switching in terms of the equipment, for example by adding additional means of routing, in particular at the output port of the communication interfaces to select the PLC or radio frequency channel. This also requires a change in the configuration of the routers and of the data routing according to the communication protocol used, on the one hand relative to the IP network, and on the other hand, relative to the vehicle. Such reconfigurations related to new routing currently require considerably more than a few seconds, which in the event of a fault for example, exceeds the tolerance of 3 seconds required by certain automatic controls of rail transport.

Generally, applications relating to processing a control/command are commonly used in transportation in particular automated transport, such as, for example, automatic urban trains without a driver. These applications use, as mentioned, controllers which may be composed of one or more computers and their associated interfaces. Depending on their function, these may either be positioned on the ground along the vehicle tracks, or on-board a vehicle or several vehicles which may or may not be coupled (several trains). In order to enable the monitoring and control of the trains along the track, the various controllers are connected between themselves by one or more networks (overhead, wire, catenary, rail, etc.).

Viewed as a whole, the architecture of the control/command processing networks may therefore be excessively complex and represent a significant equipment outlay.

Each of these networks may also be considerably long (approximately 300 meters on board the trains, several kilometers along the tracks) and is subjected to a harsh electromagnetic environment.

Moreover, for some of these networks, the links to be established are, furthermore, multipoint type connections, which increase the complexity of routing, especially in the event of a point-to-point fault.

Besides these various constraints, it is imperative to ensure correction operation of the train: the untimely stopping of a train or another problematic malfunction is neither desirable for the passengers, nor for the economical efficiency of the trains, nor even for the safety of the passengers.

Thus, in terms of a communication system adapted to a vehicle (internal and external to the vehicle), it is necessary to be able to resolve the following technical faults:

On the one hand, besides certain constraints on a physical layer of the communication network, allow a high throughput of data (for example, useful throughput of 10 Mbits/s), whilst guaranteeing a very high transmission quality (low error rate).

For example, in terms of a train, the electromagnetic environment is very powerful and the network facilitating the link between the different controllers can be disrupted by heavy and diverse interferences in particular, if the physical layer of the network uses cables whose quality is not suited to direct use (cables in "Category 5 and 6"). Similarly, for equipment on-board trains, the configuration of the network can evolve, specifically the network must be compatible with a scalable train length (variable number of vehicles, for example, after coupling). Thus, it is important to be able to reconfigure quickly and simply (automatically) a complex communication system, for example in the event of doubling the length of the train.

On the other hand, besides the complexity, a high availability of communication must be ensured so that the system can tolerate faults in a "transparent" and robust manner, in particular it is necessary to prevent a simple fault relating to the communication system (internal vehicle network, external ground network and vehicle-ground links) or a piece of equipment connected from affecting the correct operation of the control/command system.

For this reason, the command system is often duplicated to tolerate faults, in particular the networks and controllers are organised in pairs, so that one can replace the other in the event of a fault, such as noted in document EP 1533913 A1 by switching between a PLC type link and a radio frequency type link.

However, regarding this possible switching, indeed, redundancy of equipment, certain problems which are specific to the network must be resolved:

a) as already mentioned briefly, the control/command installations are subject to harsh temporal constraints. For example, certain rail transport automatisms can, at the most, tolerate, in the event of a fault, an operating interruption of approximately 3 seconds. This is less than the reconfiguration time of a "level 3" router (an integral part of a physical network layer) which requires considerably more time to replace a faulty network route with another.

b) The duplication can become difficult to manage when a high number of equipment or computers are connected to the same network.

c) Moreover, a fault on the network itself will be all the more critical as it risks simultaneously affecting several controllers or computers. Similarly, it is necessary to avoid a fault on a single piece of equipment or on a communication interface in a network affecting the others.

d) With regard to networks located on board the trains, it is necessary to remember that their configurations can be changed, specifically these networks must be compatible with a train length which is scalable according to the number of carriages/vehicles. This specific constraint must also be taken into account for network redundancy.

Considering these diverse issues, several solutions hereinafter could be envisaged, but still present some disadvantages that the invention intends to avoid.

Firstly, in order that a communication system (network) has a high flow rate over great lengths (for example, a throughput of at least 10 useful Mbits/s over a length of 300 meters), whilst ensuring a very high transmission quality in particular in the case of harsh environments (presence of strong switched currents), several solutions are known:

one solution is to use optical fibres for links between communication interfaces, but this type of solution can be difficult to envisage in some cases, for example the use of this technology can be very critical on-board trains, in particular in respect of the electrical coupler between two elements of the train to be coupled (for example carriages), and this will be even more true if the coupling is automatic.

another solution would be to create ADSL-type links, but this poses a problem, specifically this type of link is normally provided to create point-to-point links, in the case of application to a multipoint network, the architecture becomes complex, furthermore a fault involving one of the controllers linked to an ADSL type communication interface will have a certain impact on the entire network, unless a star distribution is created, in which case the cabling associated to the network would inevitably become too substantial.

a very currently used solution is to use low throughput links which unfortunately introduce a lot of constraints to the control/command installation.

Secondly, in order to tolerate faults and, in particular, to avoid a simple fault on one of the networks or one of the pieces of equipment connected affecting the operation of the communication system, several solutions are known:

The solution which seems the most conventional is to use two different redundancy networks, but this type of solution requires a significant equipment outlay. For example, on the basis that each controller is composed of two redundant computers, it is known that, in order to obtain a very high availability, each computer should preferably be connected by different ports (therefore numerous) to two networks and transmit its messages to the other controllers or computers on each of the two networks.

Another embodiment of the communication system would be to use ring networks and to connect the redundant controllers and computers to different "switches". But this type of solution only requires that the "switches" concerned are capable of "rerouting" the messages rapidly via an alternative path in the event of a localised fault (according to, for example, a technique known as "Fast Spanning Tree"). This now widespread technique is rather adapted to an "optical fibre" type physical layer which is costly to implement in trains and in equipment distributed along railways.

BRIEF SUMMARY OF THE INVENTION

An object of the present invention is to propose a communication system, in particular, adapted to a vehicle such that it is internal to the vehicle, but also by extension, external to the vehicle for communication adapted between the vehicle and a ground network or for a single ground network infrastructure, such system does not present disadvantages to the prior art, such as those aforementioned.

A first aspect of the invention provides a general solution irrespective of the viewpoint of the communication system internal or external to the vehicle and/or the ground.

The invention describes a communication system, in particular adapted for a vehicle but also for any other ground network infrastructure even in a building, and comprising a communication network between at least two communication interfaces (such as a modem) respectively connected to a first controller (with, for example, two redundant computers) which manage (in other words, run, indeed, create) a command application (for example, for guiding a train) and a second controller which also manages (in other words, runs) a command application which can be the same as that managed or run by the first controller or any other command application to be run. The communication interfaces have, for each controller, at least one communication port, from which a communication link between the controllers is thus ensured, via their respective communication interfaces.

For transmitting a command application between the two communication interfaces, the communication link is advantageously a PLC type (Powerline communication) and comprises at least two electrically conductive links connected to each of the respective communication ports through at least one coupling transformer.

Before continuing, it should be remembered that the PLC technique has already been designed in order to create computer networks using mains wires as support, high throughput links being arranged in parallel with the transport of the energy source (alternating current [220V, 50 Hz] or [110V, 60 Hz]). The advantage of this choice of technology is to enable high throughput links on non-conventional supports, the physical characteristics of which may differ from the mains wires, so as to optimise the quality and the topology of the PLC type links for use suited to the invention.

Similarly, another benefit of the PLC network is that it is a multipoint type network and does not require the installation of major equipment (provided that multiple access to the transmission medium is managed using a decentralised protocol such as CSMA—"Carrier Sense Multiple Access"— very commonly used), a single adapter (for example an Ethernet-PLC bridge) for each workstation (controller, computer, control/management device, "end user", etc.) is enough. Each communication interface can be connected in parallel with two PLC type links, like a mains network. Another advantage of this option is that it tolerates changes in the network; specifically characteristics may change over time when a device is connected to or disconnected from the electrical network. This aspect renders automatic reconfiguration of the network possible (for example, when modifying the train length after coupling or separating the vehicles of a train). This aspect of the invention also protects against multiple communication faults on the network.

As a result of the use of the PLC technique, transmission of data between the communication interfaces (or by extension between the "transmitting/receiving" controllers) is permanently guaranteed at a high transmission output on trains which are, in particular, substantially long. In the event of a failure of one of the conductive links, the object of the coupling transformer, as an advantageously passive circuit element, is to re-establish a distribution of impedance between the two links, such that the transmission of data is constantly ensured via the PLC type conductive link being intact. Thus, switching or, more specifically, any "active" equipment or equipment linked to the re-routing controls (such as a "Switch" or other data switch) is no longer advantageously necessary. Moreover, the time for redirecting data on the second PLC link is almost instant, which meets the particular temporal requirements of rail transport during any failure. On the other hand, parallel or redundant type switching from a PLC type link towards another type of communication link (such as radio frequency, ADSL, WiFi, Ethernet, etc.) is avoided, which considerably reduces the complexity of the dynamic management of the communication system proposed, but also does not require any addition of specific equipment with diverse types of communication links. Of course, for increased safety reasons for example, a link other than a PLC type link can be added in addition to the two PLC links, although the PLC type link is the most robust and the highest performing for the transmission of data intended by the invention.

As a result of there being two PLC type links, physical transmission redundancy between the two communication interfaces is thus rendered possible. Such a dual link is also very widespread and high-quality, given that everyday public transport (metropolitan, train, tramway, etc.) uses it as cables adapted to signalling of the signals along the tracks or rails. Such cables comprise at least two conductive links which can be used for the PLC technique. Each link may comprise, moreover, a pair of different electrical conductors, such as, for example, by means of cabling for urban transport signalling, for example, K23-type which is well-known to a person skilled in the art, comprising at least one pair of twisted cables and shielding. This is particularly well adapted to our invention, as it also guarantees robustness against any harsh environment, for example related to difficult mechanical conditions.

A direct current network type stacked electrical supply, for example at low voltage (24V, 72V, etc.) may also be connected to at least one of the PLC type links. This can, in particular, ensure a high data throughput and the supply of remote equipment with a single twisted pair over a large distance between the communication interfaces, such as for a substantially long train or for equipment positioned on tracks.

Moreover, in order to be able to deal with the problem of the high availability of computer networks cited in the prior art and in particular to enable faults or failures to be tolerated, the invention enables two redundancy networks to be used, however without seeking to have two truly different networks, therefore doubled by 100%. Thus, the implementation of the invention is more flexible and, furthermore, it entails a significant reduction regarding equipment, as doubling the link only involves the addition of a simple coupling transformer instead of a new communication interface or new modems.

At the same time, the desired objective is to simply ensure a very high availability of the network itself, on which it is sufficient to place redundant controllers without needing to manage multiple Ethernet paths.

To do this, tolerance to failures on the communication system depends on the definition of a new principle, which is as follows: according to the invention, each redundant controller is connected to a single PLC (Powerline communication) type network but whose physical layer has been doubled. In particular, the support comprises not a single "copper" pair but two "copper" pairs in parallel.

With regard to the solution described in the prior art which, in order to obtain extreme availability, required that each controller is preferably connected to the two networks by different ports and therefore entailed a significant number of modems (two for each controller), an advantage of the invention is that it divides the number of modems by two. It consists of connecting, via a very simple electronic circuit, each of the PLC modems (communication interface with coupling transformer) no longer to a single pair but to two "copper" pairs on the network. Thus, for each network connection, the two pairs or PLC type links of the network are connected in parallel, but can then follow various transmission channels depending on their position or their function.

The PLC type link between the different PLC modems, being able to, for example, use a large number of frequency-modulated carriers, comprises two pairs of conducting wires, thus enabling the transmission of data which depends on the impedance of the conducting wires.

If a fault appears on one of the pairs/link on the network, such as a short circuit or an open circuit, this provokes a variation in impedance and the distribution of data transmitted over the various carriers is modified such that the link is therefore maintained thanks to the high tolerance of the physical layer of the PLC technology. At the connection points (moreover communication ports) on the network at the PLC interfaces, the two networks pairs are connected in parallel, but precautions are taken. The invention specifically plans for a simple dual connection device and guaranteeing between the two pairs a sufficiently weak coupling in order to avoid, for example, that a short circuit or an interruption on a pair, in particular close to the connection point, can simultaneously interrupt, or significantly weaken, the signals which are present on the other pair.

The invention thus assumes that the coupling transformer presents a distribution of impedance between the PLC type links such that if one of the links is faulty, for example, caused by an interruption, a short circuit, a mechanical effect, etc., the other link ensures the transmission of the command application. To do this, it should also be remembered that the PLC type links are connected by pairs of conductors, preferably exclusively dedicated to the PLC technique without the obligatory presence of a supply current, which further reduces in this case, the complexity and number of components comprising the communication system.

One possible physically and economically noticeable aspect is that if necessary, at least one portion of one of the PLC type links is an electrical supply connection of a component on the communication network which could already be installed as mains wiring in a carriage or a train. Of course, the mains wiring does not present optimal properties regarding PLC type cables adapted to high throughput in a harsh environment, but may be a possible alternative if a certain link does not require high performance.

Consequently, several simple and therefore advantageous forms of coupling transformers will be presented, as well as the possibility of improving the PLC type links with a communication interface.

Devices, such as the systems of control, compensation and self-monitoring of the communication system will, if need be, also be presented in order to avoid any problematic disruption in communication.

All aspects of the invention mentioned thus provide a general solution regardless of whether the viewpoint of the communication system is internal or external to the vehicle.

In particular, the invention is an advantageous solution having several more specific communication system configurations:

1) the communication system is an internal on-board communication system: the communication interfaces, the controllers and/or at least one of the PLC type links are on board the vehicle, such as a means of public transport which may or may not be guided. The PLC link, extending along the length of the vehicles comprising public transport such as a train, connects the desired communication interfaces. Thus, if several vehicles are coupled, their communication networks are coupled by intermediate PLC type links, for example via an electrical coupler between vehicles (for example at a coupling device), via vehicle electrical supply catenaries, via a contact of the vehicles with at least one guide rail, etc. Other intermediate connections can be envisaged, but do not fall within the desired scope of the invention.

2) the communication system is an internal on-board device which can be distributed in several different means of public transport, in which case:
at least one portion of the links between two communication interfaces is respectively positioned in the first means of public transport and a second means of public transport,
the two means of transport are next to each other but, in the present case, physically separated,
the other portion of the links is composed of catenaries or electrical rails (adapted channel transmission, known PLC type) between the two means of public transport, in the event of a lack of, or in addition to, an intermediate ground network centralising communication with each of the means of public transport.

3) The communication system is a ground network (external and independent to the vehicle) of which at least one local sub-network is a PLC type according to the invention which, moreover, is adapted to a transmission of any type with the vehicle in movement, for example by a portion of a radio frequency type link (overhead) even a portion of a PLC type link which can consist of channels which share a common frequency, but which also have different frequencies if need be, such as is described in the prior art EP 1533913 A1. Effectively, the PLC technique is particularly well adapted along the channels. As a result of the insertion of a coupling transformer at a communication interface output, such a ground network can therefore enjoy the benefits described in the previous sections. Thus, the great and costly addition of equipment, in particular along the channels, could be advantageously avoided by placing simple coupling transformers at existing interfaces. More specifically, the ground communication interfaces connected by the PLC type ground links are thus all positioned on the ground, preferably along the vehicle track, in a ground communication network or in the form of clusters of consecutive sub-networks along the track thereby enabling radio communication (preferably WLAN type as nominal mode) with equipment on board the vehicle, preferably via a redundant device (and redundant bilateral transmission) comprising at least one on-board redundant type transmission/receiving router, for example by means of two logical ports of the router(s) connected to physical PLC type links in the vehicle.

The link between a controller and its communication interface according to the invention will preferably be made by means of a physical port connected to the PLC network which is on-board and/or on the ground on which two logical ports (each comprising an IP address, routing data, etc.) are created to advantageously obtain two logical then physical gateways of communication by default on each of the different routers on-board the vehicle and/or positioned on the ground, thus creating, at any moment, at least two possible communication paths for the equipment in the train and/or on the ground. Thus, two physical connections between an on-board communication interface (and the associated controller(s)) and two communication interfaces on the ground (and their associated controller(s)) ensure a high throughput transmission over the two gateways or high redundancy availability between the two gateways. This is achieved without the addition or replacement of a new communication interface.

Finally, a self-monitoring device for the communication interfaces disables, at the communication port concerned, a permanent transmission of current, voltage and interference data in the event of a failure on the communication interface.

A group of sub-claims also present advantages of the invention.

BRIEF DESCRIPTION OF THE SEVERAL VIEWS OF THE DRAWING

Exemplary embodiments and applications are provided using the figures described, in which.

DESCRIPTION OF THE INVENTION

Figure 1:
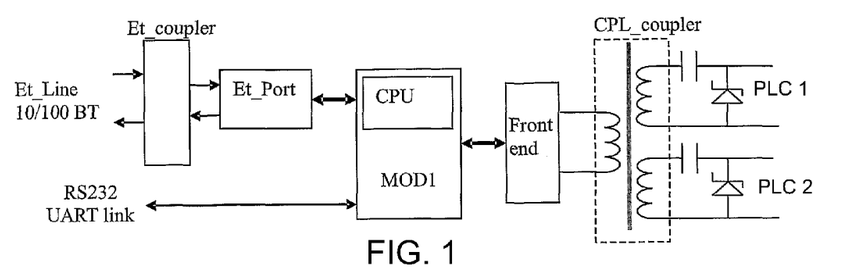
FIG. 1 shows a communication interface equipped with a PLC type communication port.

FIG. 1 describes a communication interface MOD1 equipped with a PLC type "Front End" communication port to which the PLC-coupler electrical coupling transformer is connected in order to ensure at least two physical links PLC1, PLC2 between the communication interface MOD1 with a PLC type network for example installed in a train to which another communication interface is also connected, but not represented in the figure. In this example, each link PLC1 or PLC2 comprises a pair of different electrical conductors, such as for example, a bundling of cables for K23 type urban transport signalling comprising at least two pairs of twisted cables and, possibly, shielding. The PLC-coupler coupling transformer presents impedance distribution between the links PLC1, PLC2 such that if one of the links (for example PLC1) or another link connected to it is faulty, caused for example by an interruption, short circuit, mechanical effect, etc., the other link (for example PLC2) ensures the transmission of a command application via the communication interface MOD1, by means of, for example, a CPU processor. This command application is, in practice, managed by a controller (not represented) comprising for example a computer (or several computers ensuring redundancy), the latter being connected to the communication interface MOD1, as a simple example, through the medium of a 10/100 BT type Ethernet Et_line connection and other Ethernet type coupling components (Et_coupler coupler; Et_Port port) to the interface MOD1.

Other physical communication ports at the interface MOD1 can of course be envisaged, such as that represented for a RS232 type UART Link connection or other Ethernet or PLC type links. In the sense of the invention, the use of links or portions/pairs of conductors exclusively dedicated to the PLC technique towards a network which is itself a PLC type network (for example alongside the vehicle) is principally recommended, but portions which are already in existence or of another type (and if possible not very long or rarely exposed to disturbances) will still be used at least between a controller or an executor of a command application and a command interface. All links or pairs of conductors dedicated to the PLC technique do not necessarily require the presence of a supply current as provided by the PLC technology. At the same time, at least one portion of one of the links (PLC1, PLC2) could be an electrical supply connection which is already installed in a vehicle for a component of the communication network. It is also notified that the output "on the PLC side" of the PLC_coupler coupling transformer of the low attenuation attenuators (several dB maximum) are planned, for example by means of a network of resistances/impedances positioned/distributed in series with the two links PLC1, PLC2. These improve the quality of the PLC_coupler coupling transformer, in this sense, it is avoided that an unexpected short circuit, for example at the output of the coupling transformer on the links PLC1, PLC2, cuts all the signals on the two pairs PLC1, PLC2 of conductors. This also applies if a distribution of impedance at the communication port by means of the line matching resistor at the communication interface is insufficient or unusable.

Other solutions are also possible in this sense:
to this end, the coupling transformers present sufficient series impedance to prevent the local short circuit from cutting the signal on the two networks,
bridged strands (see STUB in FIG. 3) of a PLC type network have a minimum length of approximately 20 cm which ensures sufficient impedance in the event of a short circuit on the interface MOD1 or in a link PLC1 or PLC2,
similarly, instead of adding attenuators, it can also be envisaged to use the line matching resistor as series impedance which is usually already present in the center of the communication interface MOD1 such as a modem; thus it is sufficient to move this impedance by distributing it over each of the two links PLC1, PLC2 on the PLC type network. This aspect of the invention thus enables a simple architecture to be obtained for the high availability PLC type network which tolerates faults, by using the properties of the PLC physical layer. Furthermore, the advantage of this new architecture is to create passive redundancy, on each connection of a vehicle's internal network, in general embodied by at least one on-board pair of PLC type links positioned along the vehicle to which each pair of links PLC1, (PLC2 in FIG. 1) are connected in bypass position, the two pairs PLC1, PLC2 of the network are connected in parallel. This solution avoids the need for a double connection of the redundant strands having the double disadvantage of doubling the number of interfaces such as modems and of complicating the management of logical addressing (for example 2 IP addresses per controller).

An advantageous example of the technique proposed is therefore principally based on:
a support comprised of two "copper" pairs in parallel,
a new device enabling each of the communication interfaces to be connected to the two "copper" pairs in parallel whilst ensuring a sufficiently low coupling between each other. The aim being to have, in terms of each communication interface, no longer one single link but two links for the physical layer,
according to the invention, several embodiment layouts are possible, but only the most simple solutions are proposed here which only use the passive components.

For example, one possibility of a double communication interface connection MOD1 to a PLC type network could be achieved simply:
either by using a third separate coil (such as a third conducting coil in bypass position coming from a conventional transformer with two coils) on the PLC_coupler coupling transformer at the port of each interface MOD1 and respectively connected to one of the links PLC1, PLC2, either by positioning a first then a second output transformer on each interface MOD1, respectively connected to one of the links PLC1, PLC2, or either by not modifying the interface MOD1, but by inserting an adapter circuit between the interface MOD1 and the two PLC type network links. This adapter circuit could take a simple form of a transformer with three separate coils (or any equivalent layout using two transformers).

For connecting a communication interface to the PLC type network of the communication system adapted to the PLC vehicle, the invention also recommends the use of separate transformers or coils for other reasons, in particular in order to:

prevent a short circuit to earth or other on one of the pairs of conductors affecting the other, be able to add possibly different electrical signals (such as by means of superimposed feeds, for example) or different command signals to the two pairs of conductors. With this objective, at least for one of the links PLC1, PLC2, a capacitor is placed in series with an output coil of the coupling transformer, in order not to short circuit the low electrical frequencies. This is illustrated in FIG. 1 at the output of the PLC_coupler coupling transformer, give the possibility of complementing the invention with a device for detecting faults. The objective here being, for example, to inject a continuous signal (current or voltage) on each conductor pair in order to determine if a fault exists (interruption or short circuit) within one of the two. More generally, the communication interface MOD1, the associated controller and/or one of the links PLC1, PLC2 is connected to a fault surveillance module, such as a direct current injector, or a voltage generator, placed downstream of at least one of these components and whose current, or voltage, can be measured upstream of at least one of these components.

Similarly, protection diodes, such as diodes positioned in parallel on each pair of conductors according to FIG. 1, could be added in parallel to each output of the communication interface or PLC type links/network.

To perfect this solution, the invention could be complemented by the addition and creation of a self-monitoring mechanism for communication interfaces (modems) in order that a potential modem with continuous transmission following a fault can disconnect automatically.

Figure 2:
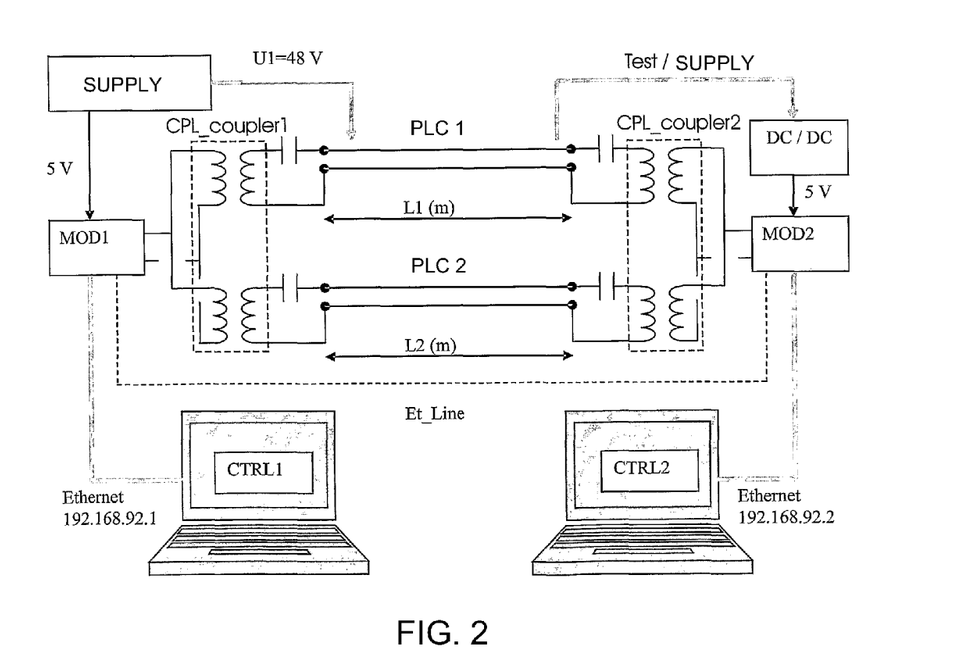
FIG. 2 shows PLC type communication network between two communication interfaces.

FIG. 2 illustrates, according to the principle of FIG. 1, a communication system adapted for a vehicle and comprising a communication network between at least two communication interfaces MOD1, MOD2 respectively connected to a first controller CTRL1 managing or generating a command application and a second controller CTRL2 here running the same command application, and for which the communication interfaces possess, for each controller, at least one physical communication port, from which a communication link between the two interfaces is possible. For transmission of the application command between the two communication interfaces, the communication link is a PLC (Powerline communication) type comprising at least two electrical conducting links PLC1, PLC2 connected to each respective communication port through at least one PLC_coupler coupling transformer. This simple communication device enables the performance of switching and transmission to be tested for the two PLC type links PLC1, PLC2, for example for different transmission lengths L1, L2. This test device enables the measurement, in particular for a considerable length L1, of a bandwidth on link PLC1 of approximately 30 Mb/s for 300 m and 10 Mb/s up to one kilometer, therefore adapted, for example, to a train with a variable length like a link between two trains which are not coupled over a journey or even between a vehicle and communication components of a ground network which can be spaced out according to the performance of the PLC type system. Of course, a PLC type network can be used as a multi-point configuration and thus communication can be established between more than two communication interfaces such as MOD1, MOD2 by positioning them in bypass position to two PLC type central channels which would be for example themselves positioned along a train. It should be noted in this example of an embodiment of a communication system, an electrical supply ALIM known as "stacked" (supplying here a voltage U1 of 48 V) is connected downstream of the link PLC1 at the PLC output of the first communication interface MOD1. This supply ALIM can be supplemented by a test device "Test/ALIM" for link PLC1 and/or can serve as a sub-supply device "Test/ALIM" (and 5V DC/DC converter) for the second communication interface MOD2, said device being located upstream of the link PLC1. Thanks to the device in FIG. 2 used as a test bench, it has been measured that the network between the controllers CTRL1, CTRL2 is resistant to connections which are cut, crossed or in short circuit on at least one of the links PLC1, PLC2. This considerable robustness enables the embodiment of a high availability fault-tolerant network to be envisaged, created with this type of PLC type connection in passive redundancy. This solution avoids the need for a communication port to be double physically attached to redundant strands which is disadvantageous in that it doubles the number of interfaces or physical ports.

Figure 3:
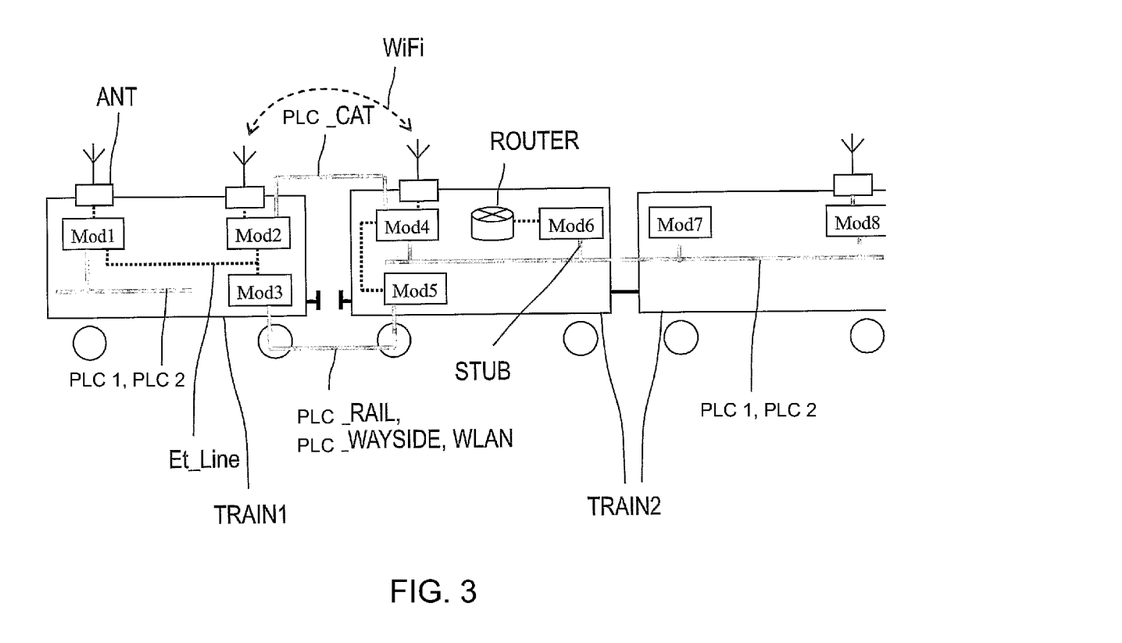
FIG. 3 shows an example of a communication system in a vehicle or between two vehicles such as trains.

FIG. 3 illustrates an example of a possible embodiment of a communication system comprising several sub-systems according to the invention:

an on-board communication system in a first vehicle TPAIN1 or an on-board communication system in a second train type vehicle TRAIN2, a communication system between two connected vehicles such as carriages for the second train type vehicle TRAIN2, a communication system between vehicles or trains TRAIN1, TPAIN2 via catenaries, railway tracks, a radio device (overhead) and/or an intermediate ground network.

The vehicle TRAIN1 comprises three communication interfaces MOD1, MOD2, MOD3 and two radio frequency transmission modules ANT. The first interface MOD is connected to a PLC type link according to the invention which is internal to the vehicle TRAIN1. The same first interface MOD1 also comprises two other physical ports, one towards one of the radio frequency transmission modules ANT for radio transmission, the other connected to an Ethernet Et_line cable, itself connected to a physical port of the second interface MOD2 as an option, according to FIG. 2. The same Ethernet Et_Line link is also connected, via an Ethernet type switch which is not represented, to the third interface MOD3, which has an additional PLC type communication port according to the invention enabling the transmission of PLC signals towards the railway rails PLC_RAIL (with adaptation for PLC type transmission according to the invention) or cables on the ground PLC WAYSIDE for PLC type rail signals towards or via a communication network on the ground or of the other train TRAIN2. The second interface MOD2, besides its Ethernet type port, also has a port to the second radio frequency transmission or WiFi module ANT as well as a PLC type communication port according to the invention which can therefore be connected via a coupling transformer to catenaries PLC_CAT of the railway tracks PLC_WAY- SIDE in order to enable a link to the other vehicle TRAIN2 or a network on the ground. In this example of embodiment, the two vehicles TRAIN1, TRAIN2 therefore have three types of diverse connections, of which two are PLC type which ensure availability, increased resistance to environmental disturbances, double redundancy and no switching effort in the event of a transmission fault.

Similarly, the train TRAIN2 with two carriages or coupled vehicles comprises at least two "central" links PLC1, PLC2 and positioned in parallel along the vehicles passing through the electrical coupling device (itself possibly being a PLC type according to the invention) between the connected vehicles. With the exception of a communication interface MOD5, all the other communication interfaces MOD4, MOD6 in the first vehicle and MOD7, MOD8 in the second vehicle are connected by strands STUB to the central links PLC1, PLC2 which enables disturbances on links PLC1, PLC2 to be minimized if a short circuit has occurred on at least one communication interface. The interface MOD5 of the second TRAIN2 represents an Ethernet-PLC bridge like the third interface MOD3 of the first train TRAIN1 described previously, the Ethernet connection being internal to the vehicle TRAIN2 and the PLC link being sent to the exterior of the vehicle. The interface MOD4 has four physical ports; one radio frequency type ANT, and/or WiFi type, one Ethernet type and two PLC type ports according to the invention (one port on a link PLC_CAT via catenaries and one port on the central link PLC1, PLC2). If necessary, several categories of bridges between the different types can be made, according to the communication interface options MOD4. This increases the possibility of redundancy or the flow of communication or enables switching on forced links when others are overloaded or out of service (no catenaries, severe electromagnetic disturbances, tunnel, overhead transmission barrier, etc.). The interface MOD6 has, in addition to its PLC type port according to the invention, a communication port to an on-board router ROUTER which can manage the routing of data internally in the second train TRAIN2, but also exterior of TRAIN2 with the other train TRAIN1 or a ground network which centralizes the communication with or between each of the means of transport TRAIN1, TRAIN2.

In summary, the communication system according to the invention advantageously covers at least three possible aspects which are adapted to one or more vehicles for which:
a) the communication interfaces, the controllers and/or at least one of the links PLC1, PLC2 are on-board the vehicle, such as a means of guided public transport TRAIN1. This is the case for an auto-guided single-vehicle type train.
b) the means of public transport TRAIN1 comprises several coupled vehicles for which the communication networks are coupled by intermediate PLC type links PLC1, PLC2, for example via an electrical coupler on a coupling device between the vehicles, via electrical supply catenaries for vehicles, via a contact for vehicles with at least one guide rail, etc, or in the lack of, or in addition to an intermediate ground or overhead network which manages the communication with each of the vehicles. This is the case for a train with several secured vehicle units.
c) at least one portion of the links PLC1, PLC2 between two communication interfaces is respectively on-board the first means of public transport TPAIN1 and a second means of public transport TRAIN2,
the two means of transport TRAIN1, TRAIN2 are separate and joined physically,
the other portion of the links PLC1, PLC2 is comprised of catenaries or electrical rails between the two means of public transport TPAIN1, TRAIN2, in the lack of, or in addition to a ground or overhead intermediate network which manages the communication with each of the means of public transport.

This is the case for two coupled trains which follow one another on a track, and respectively possess at least one vehicle unit.

Figure 4:
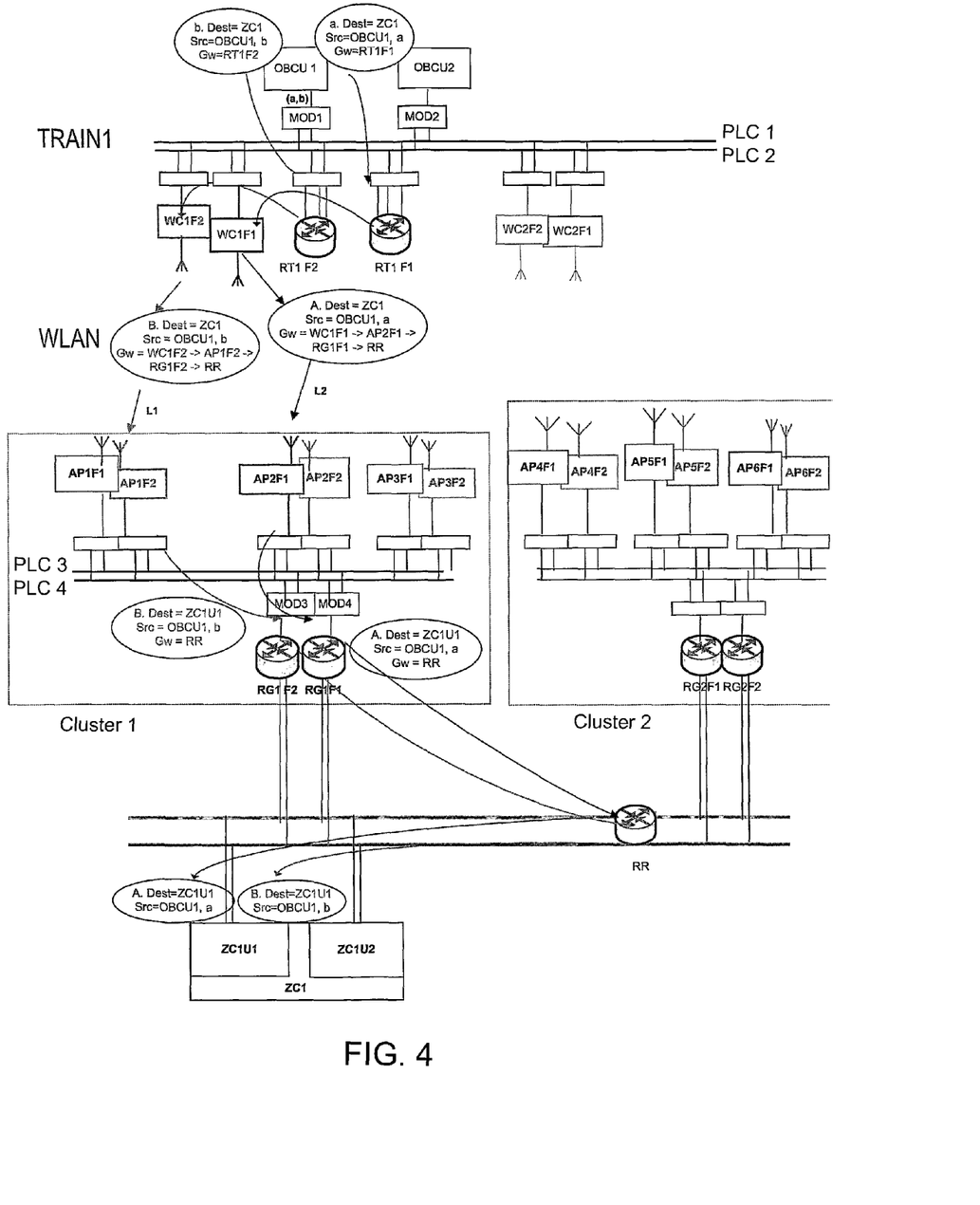
FIG. 4 shows a vehicle/ground communication system by default.

FIG. 4 illustrates an example of a communication system adapted to a vehicle for a vehicle/ground communication according to the invention and operating by default, in other words, without a transmission failure. The controllers OBCU1, OBCU2 (or computers, command or execution units, "end users" like mobile telephones, cameras or other multimedia devices, etc.) are connected to PLC type central links PLC1, PLC2 of a train via their respective communication interface MOD1, MOD2 according to the invention. A physical connection (for example, Ethernet type) between the controller OBCU1 and the communication interface MOD1 with two logical ports a, b respectively comprising an IP address and routing data. For example, routing reference bubbles on FIG. 4 should be understood in the following manner, based on the example of a data message B sent from the vehicle to the ground for which the characteristics are:
destination to a ground server ZC1: Dest=ZC1,
source of port b of the controller OBCU1: Src=OBCU1, b
route via on-board router RT1F2: Gw=RT1F2

Analogically, data from the controller OBCU1 is also to be transmitted to the logical port a via a second router RTF1F1 to the ground server ZC1. The two on-board routers RTF1F1, RTF1F2 are also coupled to the on-board PLC type links PLC1, PLC2 according to the invention and can therefore receive data from the communication interfaces MOD1, MOD2 through a single type of transmission, namely, advantageously PLC type transmission according to the invention. The on-board routers RT1F1, RT1F2 are responsible for transmitting the data from the two logical ports a, b towards the on-board radio frequency transmitters (/receivers) WC1F1, WC1F2 which have, in this example, different radio frequency emissions F1, F2 in view of redundant communication to the ground network. Radio frequencies F1, F2 should not, however, necessarily be different.

The PLC type transmission principle is the same for a second controller OBCU2 or any other on-board controller to the on-board routers RT1F1, RT1F2. The on-board routers RT1F1, RT1F2 can however redirect the data to be transmitted to the ground network via additional radio frequency type transmitters (/receivers) WC2F1, WC2F2 adapted to different (or not) radio frequency emissions F1, F2, in accordance with the algorithm selected by the best client for each frequency. Bi-directional transmission between the vehicle and the ground is possible on each of the frequencies F1, F2 and/or via the two ports a, b. Thus the communication ports of the on-board routers or communication interfaces are input and output ports.

The communication system according to the invention therefore extends to the ground in the form of a network or a set of sub-networks Cluster 1, Cluster 2, RG1F1, RG1F2, etc., which also have communication interfaces MOD3, MOD4 connected by PLC type links PLC3, PLC4 positioned on the ground, in other words, in a communication network on the ground Cluster 1, Cluster 2, RG1F1, RG1F2, etc., which facilitates additional radio communication (for example, WLAN type) with the on-board vehicle equipment, via the redundant device comprising the two redundant type transmission/receiving on-board routers RT1F1, RT1F2.

In this way, communication is established between at least the first controller OBCU1 and the associated communication interface MOD1, both of which are on-board the vehicle, and at least a second controller RG1F1, RG1F2, ZC1U1, etc. and an associated communication interface MOD3, MOD4, both of which are positioned in a second communication network on the ground. Of course, transition elements are planned for as WLAN type access points AP1F1, AP1F2, AP2F1, AP2F2, etc.; AP4F1, AP4F2, AP5F1, AP5F2, etc. and spaced out along the journey of the train on the ground in order to receive or transmit radio frequency signals to/from the ground and which, through the communication interfaces MOD3, MOD4, are connected to a sub-network Cluster1, Cluster2, etc. comprising PLC type links PLC3, PLC4 according to the invention. Pairs of access points AP1F1, AP1F2, AP2F1, AP2F2, AP4F1, AP4F2, AP5F1, AP5F2, etc. respectively comprise a transmission/receiving channel at radio frequency F1 and a transmission/receiving channel at the other radio frequency F2.

Thus, the on-board communication interface MOD1 is advantageously connected to at least one communication interface MOD3, MOD4 by two connections L1, L2, each comprising one PLC type portion on-board the vehicle and another PLC type portion on the ground and an overhead portion for radio transmission between the vehicle and the ground.

The access points AP1F1, AP1F2; AP2F1, AP2F2; AP3F1, AP3F2 are connected to the ground network via the second portion of PLC type links PLC3, PLC4 leading to the ports of two ground routers RG1F1, RG1F2 via communication interfaces MOD3, MOD4 according to the invention and also positioned on the ground. The access points AP1F1, AP1F2; AP2F1, AP2F2; AP3F1, AP3F2 respectively comprise a radio frequency type transmission/receiving channel with one of the on-board radio transmitters/receivers WC1F1, WC1F2; WC2F1, WC2F2. Each of the two different routers RG1F1, RG1F2 positioned on the ground has at least one physical port and at least two logical ports, in order to be, via its communication interface MOD3, MOD4, in communication with each access point AP1F1, AP1F2; AP2F1, AP2F2; AP3F1, AP3F2. Furthermore, the routers on the ground RG1F1, RG1F2 have two physical ports connected to a central router RR of an optical transmission type redundant network on the ground, itself connected to the second controller ZC1.

It is important to note that the invention, as a whole, provides a highly advantageous redundancy aspect, as any link between a controller and its communication interface can be created by at least one physical port and at least two logical ports, comprising, for example, two IP addresses and routing data, in order to have, by default, at least two vehicle/ground communication gateways on each of the two different routers RT1F1, RT1F2 or, by default, two on-board vehicle/vehicle communication gateways. Thus no physical switch at the communication port of the interface is necessary, as logical redundancy on a physical support permanently ensures, and at least, possible physical doubling from the communication interface output and from its coupling transformer.

Figure 5:
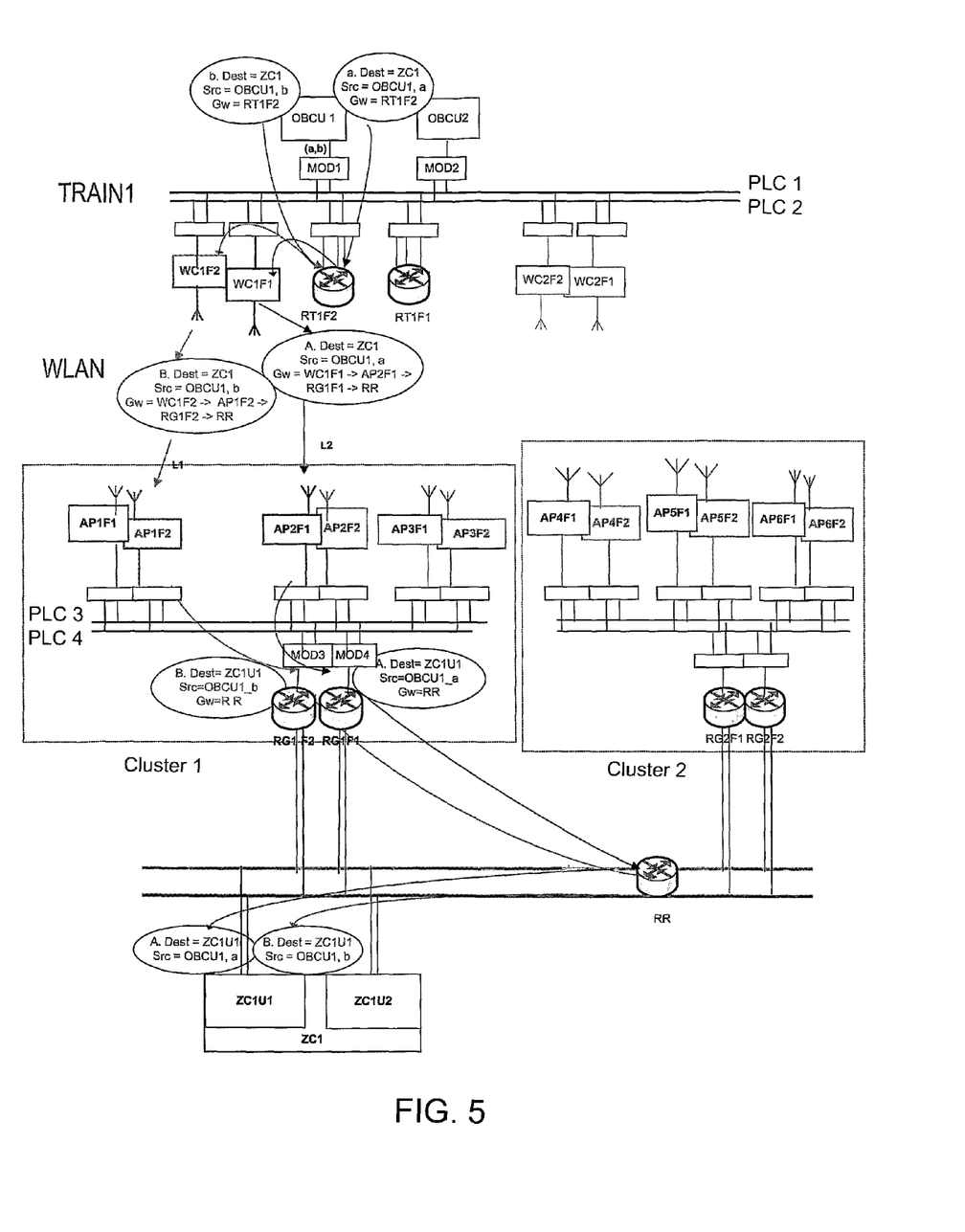
FIG. 5 shows a vehicle/ground communication system with failure on a data router from the vehicle to the ground.

FIG. 5 illustrates the system in FIG. 4 with a fault relating to the on-board router RT1F1 (intended to route radio frequency communication F1 from the interface MOD1 or the logical port a of its on-board controller OBCU1 to the ground server ZC1). This failure could also originate in the router on the ground RG1F1 corresponding to radio frequency F1. In this case, the on-board routers RT1F2 in the vehicle and those on the ground RG1F2 in nominal packet routing mode on a WLAN type network on the other radio frequency F2 are responsible for packet routing on the WLAN type networks provided on the two radio frequencies F1, F2 (reminder: the two radio frequencies F1, F2 could however be identical). Here, the message from the second logical port for which a physical type failure is noted on its router by default is then directly "re-routed" on the on-board PLC link according to the invention to an intact physical link, for example the link to the on-board router RT1F2 where the other logical port used is sent without disruption. Then, the router RT1F1 will, as in FIG. 4, direct the disrupted signal to be transmitted according to the logical data towards the required radio transmitter/receiver WC1F2. Routing without disruption of the signal following the first logical port is unchanged. Thus, in the event of a failure in the vehicle, according to the invention, new PLC type routing internal to the vehicle is very easily possible in an advantageous transparent manner for the controller OBCU1, provided that the routing (physical) to the exterior of the vehicle is not changed, as, at this level of transmission, it already remains ensured in a logical manner. This thus prevents the modification of any routing configuration of the networks and sub-networks, in particular overhead to the ground in this example where the failure originates in the vehicle. Redundancy of logical ports thus allows for dynamic routing which minimizes the usual reconfiguration efforts of the physical ports.

More generally and in the event of a fault relating to the on-board router RT1F2 and/or the ground router RG1F2 corresponding to one of the two radio frequency type links (with or without a common radio frequency), the vehicle and ground routers RT1F1, RG1F1 in packet routing nominal mode on a WLAN type network on the other intact radio frequency type link are advantageously responsible for packet routing on the WLAN type networks provided on the two radio frequency type links.

Similarly, a failure on the ground no longer imposes total reconfiguration or at least of the overhead path and of the vehicle network by the use of doubling the layer known as "logical" without new switching by undesired doubling of the layer known as "physical" thanks to PLC type links PLC3, PLC4 according to the invention.

As a result of its robustness, the communication system presented in the invention could also suit a system comprising a communication network purely on the ground (without vehicle intervention), such as for a building or for a place where the environment would be, for example, related to severe disruptions, and for which a high reliability of communication is required. Besides the public transport domain for land (train), maritime (ferry) or air (airline), this system is adapted for any other individual vehicle (car, tractor with or without a trailer, special airplane, etc).

The invention claimed is:

1. A communication system including a communication network, the communication system including:
   at least two communication interfaces between which said communication network is disposed;
   a first controller managing a command application and a second controller managing a command application, said controllers each being connected to a respective one of said at least two communication interfaces;
   said at least two communication interfaces having at least one communication port for each of said controllers;
   a power line communication link including at least two electrical conducting links; and
   at least one coupling transformer each connected between a respective one of said at least two electrical conducting links and a respective communication port for transmission of a command application between said at least two communication interfaces.

2. The system according to claim 1, wherein the system is configured for a vehicle.

3. The system according to claim 1, wherein each of said links includes a pair of different electrical conductors.

4. The system according to claim 1, wherein each of said links includes a pair of different electrical conductors with wiring for K23 type urban transport signaling including at least one pair of twisted unshielded cables or twisted shielded cables.

5. The system according to claim 1, wherein said coupling transformer has impedance distribution between said links such that if one of said links is faulty due to an interruption, short circuit or mechanical effect, the other of said links ensures the transmission of the command application.

6. The system according to claim 1, wherein said links are connected by pairs of conductors exclusively dedicated to a PLC (power line communication) technique without a presence of a stacked supply current.

7. The system according to claim 1, wherein at least one portion of one of said links is an electrical supply connection of a component of the communication network.

8. The system according to claim 1, wherein said coupling transformer is composed of at least a third conducting coil connected to one of said links.

9. The system according to claim 1, wherein said coupling transformer is composed of two electrical transformers each connected to a respective one of said links.

10. The system according to claim 1, wherein said coupling transformer has a series impedance and/or minimal leak inductance.

11. The system according to claim 1, which further comprises at least one attenuator positioned between said two links and said communication port, if distribution of impedance at said communication port by a line matching resistor at said communication interface is insufficient or unusable.

12. The system according to claim 1, wherein said at least one attenuator is a resistor network for which attenuation is approximately several decibels.

13. The system according to claim 1, wherein said two links include different electrical frequency carriers and/or transmit different command signals.

14. The system according to claim 1, which further comprises, at least for one of said links, a capacitor placed in series with a coupling transformer output coil, in order to superimpose various currents of electrical carriers and a low frequency or direct current supply.

15. The system according to claim 1, which further comprises a fault surveillance module disposed downstream of at least one of said communication interface, said controller or one of said links and having a current or voltage to be measured upstream of at least one of said communication interface, said controller or one of said links.

16. The system according to claim 15, wherein said fault surveillance module is a direct current injector or a voltage generator.

17. The system according to claim 1, wherein at least one of said communication interfaces, said controllers or at least one of said links is on-board a vehicle or public transport device.

18. The system according to claim 17, wherein the public transport device includes several connected vehicles having communication networks coupled by power line communication intermediate links.

19. The system according to claim 17, wherein the public transport device includes several connected vehicles having communication networks coupled by power line communication intermediate links through an electrical coupler at a coupling device between vehicles, through electrical supply catenaries of the vehicles, through a contact for the vehicles with at least one guide rail, with a lack of or in addition to an intermediate network on the ground or overhead, managing the communication with each of the vehicles.

20. The system according to claim 17, wherein:
at least one portion of said links between said two communication interfaces is respectively on-board a first public transport device and a second public transport device;
the two public transport devices are separated and connected physically; and
another portion of said links is composed of catenaries or electrical rails between the two public transport devices with a lack of or in addition to an intermediate ground or overhead network managing the communication with each of the public transport devices.

21. The system according to claim 1, further comprising communication interfaces connected by power line communication links positioned on the ground in a ground communication network facilitating radio communication with equipment on-board a vehicle, through a redundant device including two redundant type on-board transmission/receiving routers.

22. The system according to claim 1, wherein:
at least said first controller and said associated communication interface are on-board a vehicle and at least a second controller and an associated communication interface are positioned in a second communication network on the ground; and
an on-board communication interface is connected to at least one communication interface by two links respectively including one power line communication link on-board the vehicle and another power line communication link on the ground and an overhead portion for radio transmission between the vehicle and the ground.

23. The system according to claim 22, wherein said on-board communication interface is connected through a first one of said links to two vehicle routers transmitting and/or receiving data to/from the ground through at least two on-board radio transmitters/receivers, having either the same radio frequency or two different radio frequencies.

24. The system according to claim 23, which further comprises a link between a controller and its communication interface made by at least one physical port and at least two logical ports in order to have, by default, two vehicle/ground or vehicle/vehicle communication gateways on each of said two different and on-board routers.

25. The system according to claim 24, wherein said ports include two IP addresses and routing data.

26. The system according to claim 23, which further comprises:
pairs of radio transmitter/receiver type access points distributed on the ground along a vehicle journey, respectively including a radio frequency type transmission/receiving channel with one of said on-board radio transmitters/receivers; and
access points connected to the ground through a second one of said links leading to ports of said two routers positioned on the ground, themselves having two ports connected to said second communication interface of said second controller through a central router on the ground.

27. The system according to claim 26, wherein in the event of a fault relating to said on-board router and/or said ground router corresponding to one of said two radio frequency type links, said vehicle and ground routers in packet routing nominal mode on a WLAN type network on the other of said intact radio frequency type link is responsible for packet routing on WLAN type networks provided on said two radio frequency type links.

28. The system according to claim 27, wherein each of said two different routers positioned on the ground has at least one physical port and at least two logical ports, in such a way that, through its communication interface, they are in communication with each access point.

29. The system according to claim 1, wherein said communication interfaces are connected to said electrical conducting links through strands in a bypass position for minimizing a disruption on said electrical conducting links if a short circuit occurs on at least one communication interface.

30. The system according to claim, which further comprises a self-monitoring device for said communication interfaces configured to disable, at said communication port concerned, a permanent transmission of interference data in the event of a failure on said communication interface.

* * * * *

UNITED STATES PATENT AND TRADEMARK OFFICE
CERTIFICATE OF CORRECTION

PATENT NO. : 8,605,740 B2  
APPLICATION NO. : 12/376022  
DATED : December 10, 2013  
INVENTOR(S) : Eric Chenu et al.

Page 1 of 1

It is certified that error appears in the above-identified patent and that said Letters Patent is hereby corrected as shown below:

In the Claims

Column 19,

Line 14, "The system according to claim, which further"

should read -- The system according to claim 26, which further --

Signed and Sealed this
Twenty-seventh Day of May, 2014

Michelle K. Lee
*Deputy Director of the United States Patent and Trademark Office*